United States Patent [19]
Thomas

[11] 3,895,734
[45] July 22, 1975

[54] THIN-WALLED CONTAINERS

[75] Inventor: Lindsay Maitland Thomas, Chisworth near Stockport, England

[73] Assignee: Fairey Stainless Limited, Heston, England

[22] Filed: Mar. 19, 1973

[21] Appl. No.: 342,905

Related U.S. Application Data

[62] Division of Ser. No. 204,250, Dec. 2, 1971, Pat. No. 3,729,812.

[30] Foreign Application Priority Data
Dec. 2, 1970 United Kingdom............... 57247/70

[52] U.S. Cl............................ 220/5 R; 220/DIG. 1
[51] Int. Cl............................................... B65d 7/02
[58] Field of Search............ 220/5 R, DIG. 1, 63 R, 220/39 R; 113/120 L

[56] References Cited
UNITED STATES PATENTS

| | | | |
|---|---|---|---|
| 1,452,391 | 4/1923 | Rupert........................... | 220/39 R X |
| 1,748,138 | 2/1930 | McBride......................... | 220/5 R X |
| 1,800,082 | 4/1931 | Knigge........................... | 220/DIG. 1 |
| 1,904,755 | 4/1933 | Wolf............................... | 220/DIG. 1 |
| 2,038,420 | 4/1936 | Coakley.......................... | 220/5 R |
| 2,326,137 | 8/1943 | Gettelman....................... | 220/63 R |
| 2,404,484 | 7/1946 | Gettelman..................... | 220/DIG. 1 |
| 2,625,297 | 1/1953 | Koppel............................ | 220/63 R |
| 3,348,721 | 10/1967 | Trevarrow, Jr. .................... | 220/5 R |

*Primary Examiner*—William I. Price
*Assistant Examiner*—Steven M. Pollard
*Attorney, Agent, or Firm*—Sughrue, Rothwell, Mion, Zinn and Macpeak

[57] ABSTRACT

Metal containers, particularly for beer, have been made from stainless steel which is compatible with beer or aluminium which is specially coated to make a compatible inner surface. The stainless steel container is expensive when the wall thickness is such as to withstand rough handling and the cheaper aluminium container has a limited life depending on the internal coating. The present invention provides a double wall container of which the inner wall is of thin stainless steel. The invention solves the hitherto insurmountable problems of forming a thin walled inner vessel and expanding it inside an outer vessel so that the resulting inner vessel is without crevices which would otherwise be extremely difficult to clean to meet strict hygiene regulations.

9 Claims, 8 Drawing Figures

PATENTED JUL 22 1975 3,895,734
SHEET 1
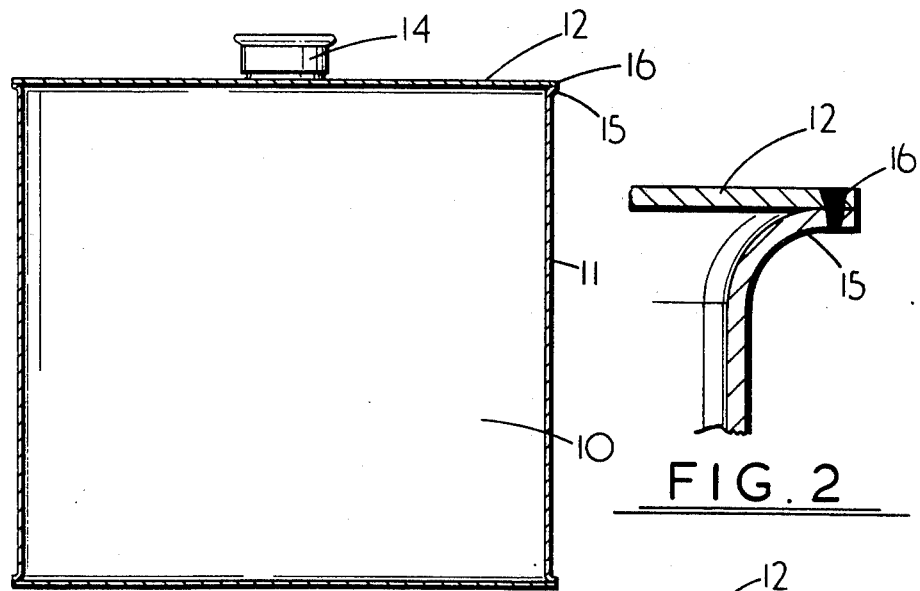
FIG. 1
FIG. 2
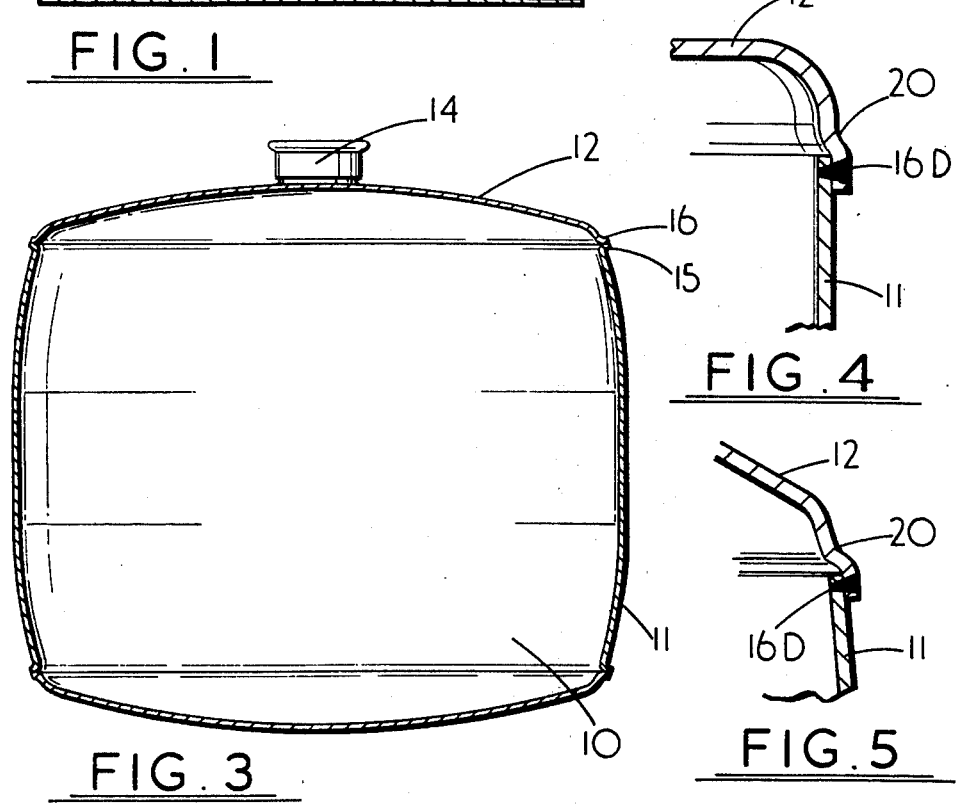
FIG. 3
FIG. 4
FIG. 5

THIN-WALLED CONTAINERS

This is a Division of application Ser. No. 204,250, filed Dec. 2, 1971, now U.S. Pat. No. 3,729,812.

This invention relates to double walled containers and their manufacture. Such containers are suitable but not exclusively for use in beer kegs.

According to one aspect of the present invention, there is provided a method of making a double wall container in which the inner vessel is a thin-walled vessel of stainless steel. The method comprises the steps of forming two or more co-operating pieces of the inner vessel from sheet stainless steel and forming the mating edges to enable the pieces to be welded together in a manner which permits subsequent flattening, straightening or smoothing of the welded seams, welding an entry boss to one of the pieces, holding the pieces together in correct relationship and welding the joint or joints to form a liquid-tight container, inserting the inner vessel in a surrounding rigid outer vessel, and admitting fluid under pressure to the interior of the inner vessel to expand it and cause it to conform substantially to the internal shape of the outer vessel, thereby flattening, straightening or smoothing to a substantial degree the welded seam or seams of the inner vessel.

According to another aspect of the invention, there is provided a double walled container. The double walled container comprises inner, thin-walled vessel of stainless steel and an outer rigid vessel, the inner vessel being formed from two or more pieces of sheet stainless steel welded together in a manner such that, after expansion of the inner vessel to conform substantially with the inner surface of the outer vessel using fluid pressure, the welded seam or seams are flattened, straightened or smoothed to a substantial degree.

The hydraulic or pneumatic expansion of the inner vessel against the inner surface of the rigid outer vessel has the effect of flattening, straightening or smoothing to some degree the welded seams of the inner vessel, depending upon the original form of those welded seams, and thereby of eliminating or reducing any internal crevices at these seams.

The invention thus provides a single and economical way of manufacturing a thin-walled container having a double skin, whereof the inner skin is made of a different material from the outer skin, and whose interior is substantially free of crevices such as would render thorough cleaning out of the container difficult.

The mating edges of at least one of the pieces is flanged outwards so that, in the area of the weld, the adjacent pieces are parallel to each other or make a small included angle.

Conveniently, the inner vessel is formed of two dome shaped pieces which are outwardly flanged at the rims and after being brought together the two flanges are seam welded to give a liquid-tight joint.

The inner vessel may be enclosed in two dome shaped portions of an outer vessel and the assembly mounted in an expansion rig without the two outer vessel portions being welded together. The interior of the inner vessel is coupled to a source of hydraulic fluid, and by means of the pressure of the fluid the inner vessel is expanded to conform substantially to the inner surface of the outer vessel, the forces on the outer vessel being taken by the rig.

Conveniently, the entry boss is formed of a stainless steel liner having an outwardly turned flange at the top and an inwardly turned flange at the bottom and being internally threaded, said liner being surrounded by an aluminium sleeve which is sealingly secured thereto to provide a substantially cylindrical assembly which passes through an aperture in the outer vessel when the inner vessel is assembled to the outer vessel. The underside of the inwardly turned flange is provided with an annular upstand which lies concentric and parallel with a flange formed around an aperture in the inner vessel to which the liner is to be welded, the welding operation burning away a substantial part of the upstand.

If desired the inner surfaces of the outer vessel may be scored to facilitate exits of air from between the inner and outer vessels during expansion.

The outer vessel may be provided with circumferential raised portions to act as rolling ways. The extent of the raised portions may be chosen to provide the required degree of expansion to the inner vessel during expansion to flatten, straighten or smooth the welded seam.

Embodiments of the invention will now be described, by way of example, with reference to the accompanying drawings, in which:

FIG. 1 is a sectional view of the inner vessel of a double-walled container, before its expansion;

FIG. 2 is an enlarged detailed sectional view of one of the welded joints of the inner container of FIG. 1;

FIG. 3 is a sectional view of the inner container of FIG. 1 after expansion;

FIGS. 4 and 5 show modified forms of welded joints which may be used in place of that shown in FIG. 2.

Figure 6:
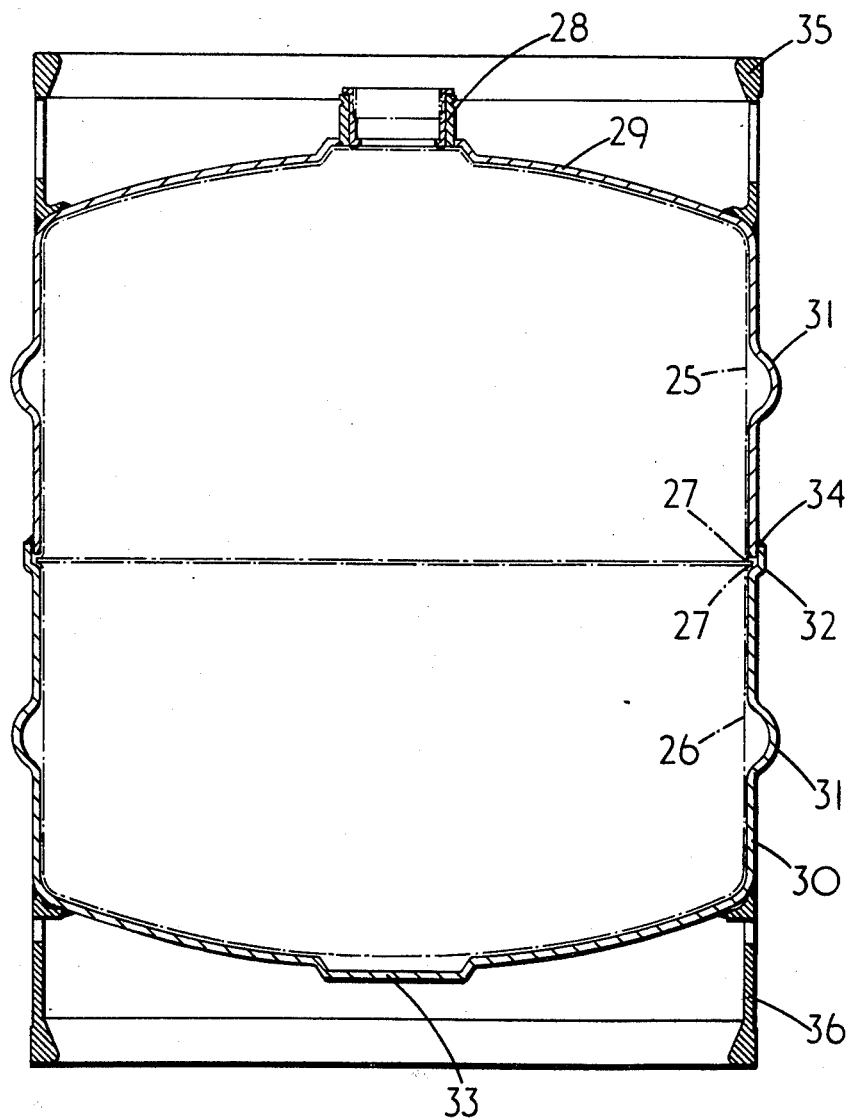
FIG. 6 is a sectional view of another embodiment of the invention, before expansion of the inner container.

In the embodiment of FIGS. 1–3, a double-walled container for use as a beer keg is manufactured as follows. Firstly an inner container 10 is made by welding together an open-ended thin-walled sheet metal tube 11 of stainless steel and two thin sheet metal end plates 12 also made of stainless steel, to form a generally cylindrical vessel as shown in FIG. 1. One of the end plates 12 has a spout portion 14 formed or welded to it. The tube 10 and the plates 12 are made of thin gauge stainless sheet typically 0.009 inch (0.2 mm) to 0.020 inch (0.5 mm) thick, for example 0.012 inch (0.3 mm). The container 10 is formed by welding the edges of the end plates 12 respectively to the top and bottom edges 15 of the tube 11, so that the plates close the open ends of the tube.

As shown in FIG. 2, both end portions 15 of the tube 11 are bent outwardly before welding to form circumferential flanges projecting substantially at right angles to the wall of the tube, the junction of each flange and the cylindrical wall part of the tube being smoothly curved. The end plates 12 are placed in position against the out-turned flanges 15, and welded joints 16 are made along these overlapped portions, close to the radially outer edges of the flanges and of the end plates, to form a closed thin-walled inner vessel of generally cylindrical flanged form.

The completed inner vessel is then placed inside a larger rigid container (not shown) made for example of aluminium, or of a plastics material reinforced with aluminium, this larger container constituting a rigid outer enclosure or outer wall and being also used as a mould as will be described.

The inner container is then expanded by the admission into its interior of pneumatic or hydraulic fluid under high pressure, to cause it to conform to the internal shape of the rigid outer container and to straighten out and flatten the welded seams of the inner container as shown in FIG. 3. In this way the crevice which previously existed between each flange 15 and the margin of the adjacent end plate 12 leading to the welded joint 16 is substantially eliminated by the straightening of the joint caused by the expansion of the inner vessel within the rigid outer vessel.

Another form of joint which may be used for the inner container is shown in FIGS. 4 and 5. In this case the margin of each end plate 12 is smoothly bent over to project at right angles to the plate 12 as a circumferential flange, and the outer edge of this flange is joggled outwardly at 20. One end of the tube 11 is then inserted within the joggled portion 20 and a welded seam is made at 16D. FIG. 5 shows the shape of the joint after the inner vessel has been expanded; only a very small crevice remains internally at the joint.

Figure 7:
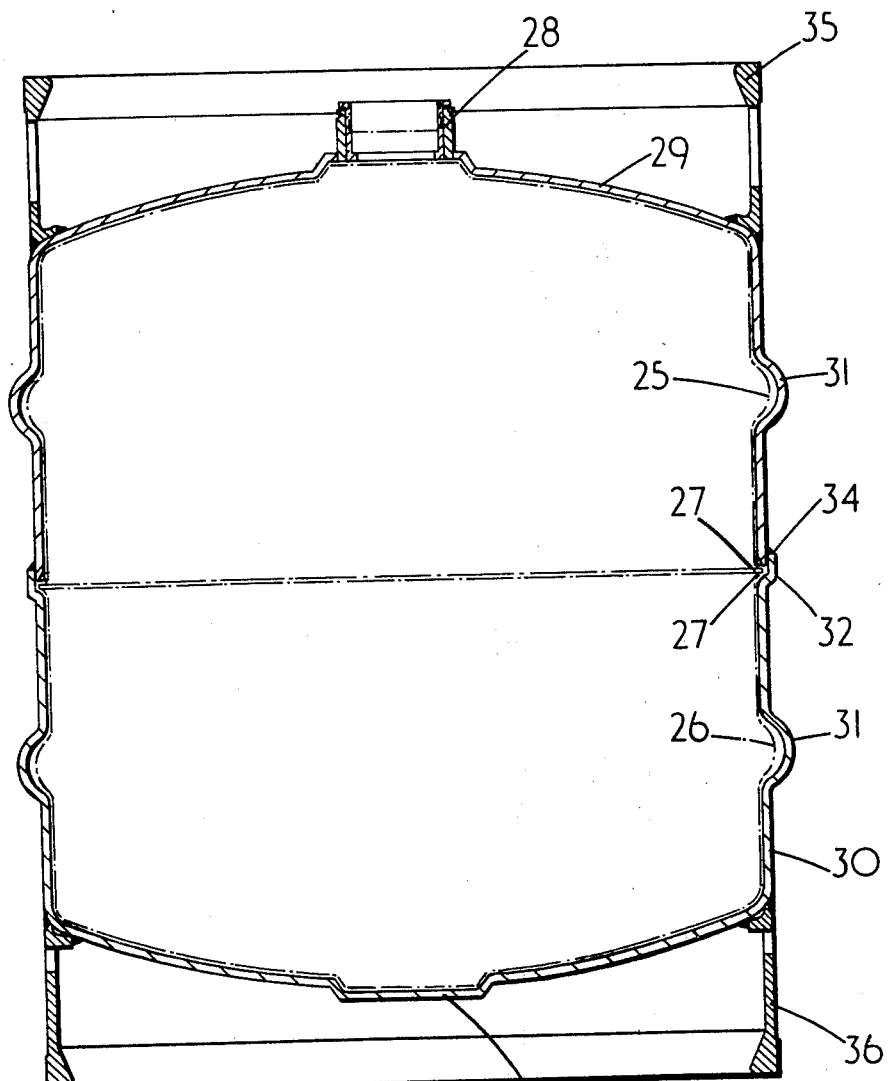
FIG. 7 is a similar view to that of FIG. 6, but after expansion of the inner container.

FIG. 6 and 7 show another embodiment of the invention for use as a beer keg. The inner container of stainless steel comprises upper and lower domes 25 and 26 formed by deep pressing. In the pressing of the domes, a small flange 27 is formed at the rim of each dome. The upper dome is provided with an aperture into which is welded an entry boss 28 as will be described in more detail later. The upper and lower domes are brought together, and the mating flanges 27 which make a small included angle are welded together by plasma arc welding techniques to form a circumferential joint which stands proud of the outer surface of the inner container so formed.

As a separate operation, upper and lower outer domes 29 and 30 are formed by pressing. These domes are of aluminium of approximately 2.5 mm thickness and are provided with circumferential raised portions 31 to act as rolling ways. The upper dome 29 is provided with an aperture to allow the passage of the boss 28, and the lower dome 30 is provided with an outwardly joggled edge 32 which forms a socket for the upper dome rim and a recess to accommodate the circumferential joint of the inner container.

The unexpanded inner container is enclosed in an upper and a lower outer dome and the assembly is inserted in an expansion rig (not shown) which has mould halves to accommodate the container. At this stage the outer domes are not welded together and expansion forces are taken on the rig. The fact that the outer domes are not welded together allows escape of the air between the inner and outer containers when expansion occurs, allows leakages to be detected if the inner container should rupture during expansion, and allows limited volumetric adjustment to be made.

A hydraulic connection is made to the boss 28, and hydraulic fluid under pressure is admitted to the inner container causing it to expand to conform to the contours of the outer container. By careful metering-in of the hydraulic fluid, a close tolerance inner container capacity is obtained and established. Air from between the containers escapes through the dry joint between the outer domes and if desired slight scoring may be made in the inner surface of the outer domes to facilitate air escape. During expansion the inner container enters the rolling ways 31 and also the dimple 33. If desired, a small amount of adhesive may be placed in the dimple 33 of the outer dome before assembly so that the inner container is secured to the outer to avoid the possibility of implosion if a vacuum should be formed during steam cleaning. Also the welded flange formed from flanges 27 enters the recess formed between the rim of the upper outer dome 28 and the joggled edge 32 of the lower dome 30 and in entering the recess pulls the weld to open out the crevice and straighten the joint thereby facilitating cleaning out of the container.

The assembly is removed from the expansion rig and the joint 34 between the upper and lower outer domes is formed by welding. A weld is run round the boss 28 and skirts 35 and 36 are welded to the ends of the container. Skirt 35 is provided with hand holds 37 and drain holes (not shown) adjacent the container to allow spillage to drain away.

Figure 8:
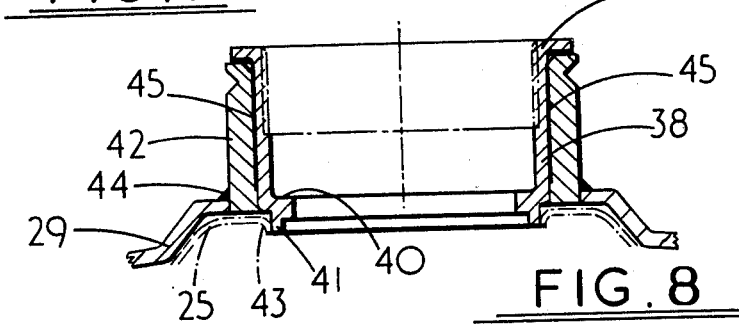
FIG. 8 shows detail of the entry boss to the container.

FIG. 8 shows in more detail the construction of the boss 28, known as a Barnes neck. It is essential that an uninterrupted stainless steel surface is presented to the beer to be carried in the container, and therefore the boss has a stainless steel liner 38 with internal threading. Liner 38 has an out-turned lip 39 and an in-turned seating lip 40 for seating a bung (not shown). Lip 40, on its surface away from its seating surface, has a downwardly directed small flange 41. Surrounding the liner 38 is an aluminium sleeve 42 which is secured to the liner 38 by an adhesive 45 chosen to avoid any olectrolytic action between the two metals. This assembly is inserted into the aperture in the upper inner dome 25, which aperture has been prepared by plunging to form an inwardly turned rim 43 which extends parallel and concentric with the small flange 41. The two are then welded together, the metal being burned down until the resultant weld lies substantially in the plane of the under surface of the in-turned lip 40. The assembly now is such that it can be inserted through the aperture in the upper outer dome 29 and in due course a weld line 44 is run around the boss.

As an alternative, the sleeve 42 may be sealingly secured to the linear 38 using an elastomer seal, such as an O-ring or washer, with mechanical means to prevent relative rotational or axial movement. Such mechanical means may include straight knurling or splining to give an interference fit against relative rotational movement and swaging or the like to prevent relative axial movement.

What is claimed is:

1. A double walled container comprising:
   a. a rigid outer vessel forming the outer wall of said double walled container and
   b. a liner inserted in said rigid outer vessel, said liner being constructed to expand to conform substantially with the inner surface of said outer vessel using fluid pressure, said liner comprising
      i. an open-ended, thin-walled tube of stainless steel the end portions of which are bent outwardly to form circumferential flanges projecting substantially at right angles to the wall of the tube, the junction of each flange and the wall of the tube being smoothly curved, and
      ii. two thin end plates made of stainless steel and of size and shape to span the open ends of the tube, one of the end plates being welded to each of the flanges on the tube along the overlapping portion, close to the radially outer edges of the flanges and of the end plates, the shape of the weld between the tube and the end plates constituting means responsive to fluid pressure for stretching the welding seams between the tube and the end plates to effect weld seams which are substantially flat internally.

2. A liner as claimed in claim 1 and further comprising an entry boss mounted on one of said end plates, said entry boss comprising:
1. a generally cylindrical stainless steel member having an outwardly turned flange at the top and an inwardly turned flange at the bottom and
2. an aluminum sleeve surrounding the cylindrical walls of said stainless steel member and sealingly secured thereto, whereby a substantially cylindrical assembly is formed.

3. A liner as claimed in claim 2 wherein:
1. said end plate is provided with an aperture having an inwardly turned flange to receive said entry boss;
2. the underside of the inwardly turned flange on said stainless steel member is provided with an annular lip which lies concentric with and parallel to the inwardly turned flange in said end plate; and
3. said entry boss is welded to said end plate where the inwardly turned flange on said end plate and the annular lip on said stainless steel member abut.

4. A double walled container comprising:
a. a rigid outer vessel forming the outer wall of said double walled container and
b. a liner inserted in said rigid outer vessel, said liner being constructed to expand to conform substantially with the inner surface of said outer vessel using fluid pressure, said liner comprising
   i. an open-faced, thin-walled upper dome of stainless steel the rim of which is bent outwardly to form a circumferential flange projecting substantially at a right angle to the wall of the upper dome, the junction of the flange and the wall of the upper dome being smoothly curved, and
   ii. an open-faced, thin-walled lower dome of stainless steel the rim of which is bent outwardly to form a circumferential flange projecting substantially at a right angle to the wall of the lower dome, the junction of the flange and the wall of the lower dome being smoothly curved, the lower dome being of size and shape to span the open face of the upper dome with the circumferential flanges of each over-lapping, the upper and lower domes being welded to each other along the over-lapping portion of their respective flanges, the shape of the weld between the upper and lower domes constituting means responsive to fluid pressure for stretching the welding seams between the upper and lower domes to effect weld seams which are substantially flat internally.

5. A liner as claimed in claim 4 and further comprising an entry boss mounted on one of said domes, said entry boss comprising:
1. a generally cylindrical stainless steel member having an outwardly turned flange at the top and an inwardly turned flange at the bottom and
2. an aluminum sleeve surrounding the cylindrical walls of said stainless steel member and sealingly secured thereto, whereby a substantially cylindrical assembly is formed.

6. A liner as claimed in claim 5 wherein:
1. said one of said domes is provided with an aperture having an inwardly turned flange to receive said entry boss;
2. the underside of the inwardly turned flange on said stainless steel member is provided with an annular lip which lies concentric with and parallel to the inwardly turned flange on said one of said domes; and
3. said entry boss is welded to said one of said domes where the inwardly turned flange on said one of said domes and the annular lip on said stainless steel member abut.

7. A double walled container comprising:
a. a rigid outer vessel forming the outer wall of said double walled container and
b. at least two thin-walled components separately manufactured of stainless steel at least one of which has at least one edge portion bent outwardly to form a flange projecting substantially at a right angle to the wall of the component, the junction of the flange and the component of which it is a part being smoothly curved, the components being of size and shape to engage each other in facing relationship with the flange over-lapping a mating surface on the other component and being welded to each other along the over-lapping portion of the flange and the mating surface on the other component, the shape of the weld between the components constituting means responsive to fluid pressure for stretching the welding seam between the components to effect a weld seam which is substantially flat internally.

8. A liner as claimed in claim 7 and further comprising an entry boss mounted on one of said components, said entry boss comprising:
1. a generally cylindrical stainless steel member having an outwardly turned flange at the top and an inwardly turned flange at the bottom and
2. an aluminum sleeve surrounding the cylindrical walls of said stainless steel member and sealingly secured thereto, whereby a substantially cylindrical assembly is formed.

9. A liner as claimed in claim 8 wherein:
1. said one of said components is provided with an aperture having an inwardly turned flange to receive said entry boss;
2. the underside of the inwardly turned flange on said stainless steel member is provided with an annular lip which lies concentric with and parallel to the inwardly turned flange on said one of said components; and
3. said entry boss is welded to said one of said components where the inwardly turned flange on said one of said components and the annular lip on said stainless steel member abut.

* * * * *